*Mills Cloth measuring and ruling Machine*
PATENTED JUL 25 1871
117443

Fig. 1 Top view

Fig. 2 Side view

Witnesses:
W. Bruce
P. L. Scriven

Isaac Mills

UNITED STATES PATENT OFFICE.

ISAAC MILLS, OF HAMILTON, CANADA.

IMPROVEMENT IN CLOTH-MEASURING MACHINES.

Specification forming part of Letters Patent No. 117,443, dated July 25, 1871.

*To all whom it may concern:*

Be it known that I, ISAAC MILLS, of the city of Hamilton, in the county of Wentworth, in the Province of Ontario, Canada, have invented a new and useful Machine for Measuring Cloth, &c., of which the following is a specification:

The nature of my invention relates to a simple and effectual time and labor-saving device for quickly and correctly measuring and rolling cloth in "taking stock" or otherwise, for the assistance of manufacturers and wholesale and retail dry-goods dealers.

Figure 7:
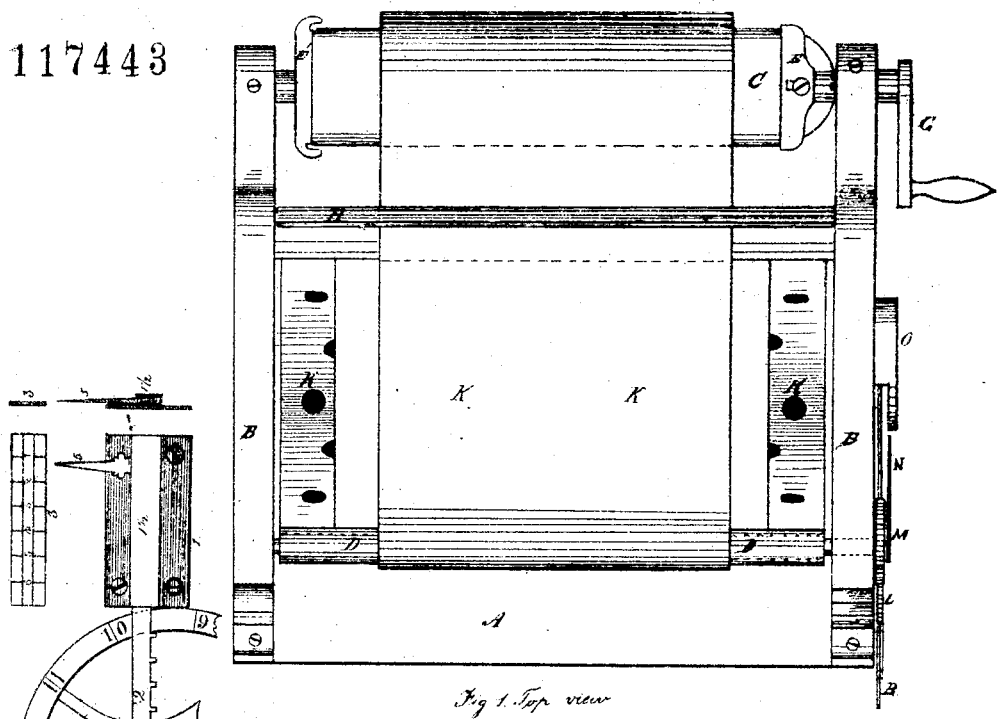
Figure 3:
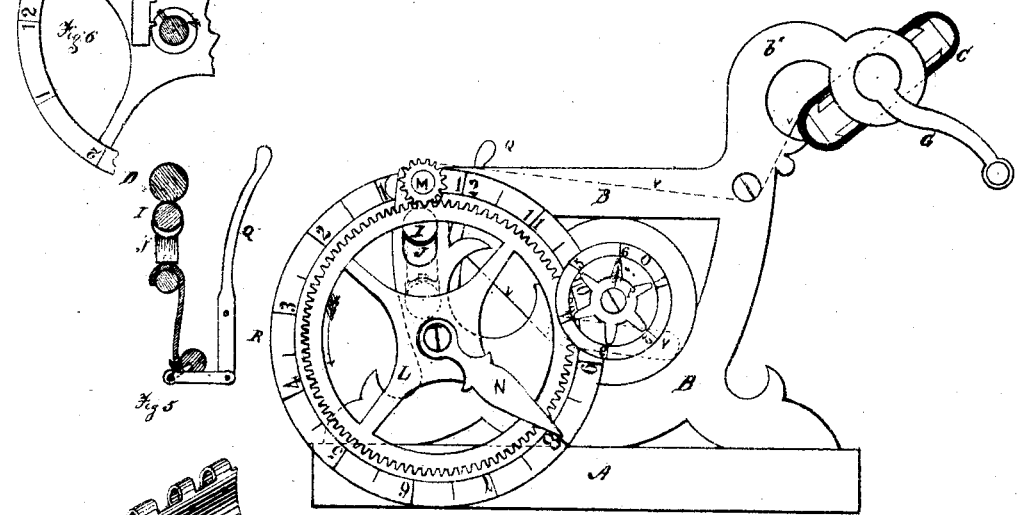
Figure 4:
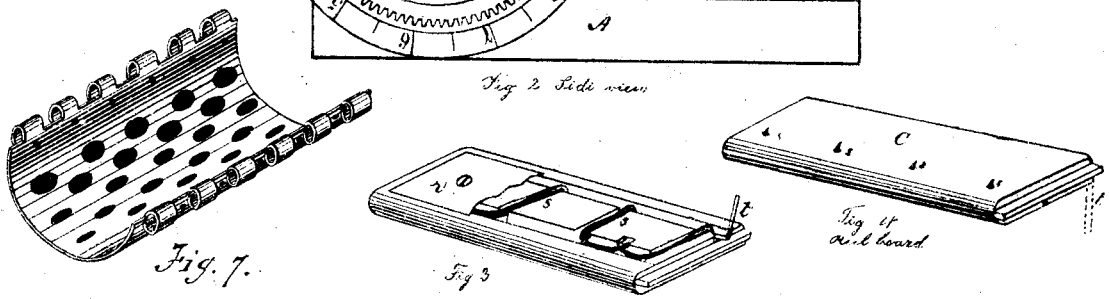

Figure 1 is a top view of the device. Fig. 2 is a side view. Figs. 3 and 4 represent a top and bottom view of cloth-reel; Fig. 5, detached section of tension-lever Q, for regulating tension. Fig. 7 represents the perforated basket, detached.

B B is a frame of brass, iron, or other suitable material, secured to the stand A. The hollow part k is a receptacle for rolls of cloth. D is a measure-roller, covered with rubber, &c., revolving between the sides B B. H is a tension-roller, under which the cloth passes. C is a reel-board with concealed springs and adjustable points for holding the cloth when first put on. (See Figs. 3 and 4.) E is an adjustable spring-socket to hold the reel-board C, as shown in Fig. 1. G is a crank-handle for turning the reel-board. M is a small pinion attached to the outer end of the measure-wheel D, which turns the measure cog-wheel L, to which a stationary index-pointer, N, is secured. R is a circular dial, immovably secured to the side of the frame B, upon which figures are stamped, indicating yards, from one to twelve. O is a smaller circular dial, upon which are marked figures from one to six, the use of which will be shown hereafter. P is a revolving register, pivoted in the center of the dial o, having six arms, one of which acts as an index-pointer, as shown. I is another tension-roller, a section of which is seen in Fig. 2, revolving in a slot under the measure-roller D. A bow-spring, J, is so arranged as to press against it continually at each end, so as to create a tension on the cloth passing between the two rollers. The dotted line v represents the cloth passing from the receptacle K to the reel-board C.

The operation of measuring cloth is performed as follows: The goods to be measured are placed in the basket K, and this feature of the basket constitutes the great advantage of my device, it being formed of a perforated material. As the roll or piece of cloth or other goods is rapidly revolved, through the automatic action of the machine, it is thoroughly shaken, the dust that has accumulated escaping through the perforations. One end of the goods is now pushed through and between the measure-roller D and tension-roller I, from thence under the other tension-roller H and fastened to the reel-board C, which is turned by the crank-handle G. The measure-roller D is constructed of such a size as on each revolution it will measure one yard and indicate it on the dial K by the pointer N. One entire revolution of the pointer N indicates twelve yards. On the drawing it indicates that eight yards have been measured. On each revolution of the said pointer it comes in contact with one of the arms of the register P, the index-pointer of which is turned to Fig. 6 before measuring, and it indicates, by the figures on the small dial, how many revolutions the wheel L and pointer N have made up to 6; consequently, one revolution of the pointer indicates twelve yards, and the index-pointer of the register is turned by the pointer N of the wheel L to the Fig. 1 on the small dial. Two revolutions of the measure-wheel turn and adjust the said pointer P to Fig. 2 on the small wheel, which will be twelve multiplied by two equals twenty-four yards, and so on up to No. 6, which, when the register points to that figure, indicates that the measure-wheel has made six entire revolutions, which would be twelve multiplied by six equals seventy-two yards. If a roll of cloth measures over that number it is easily calculated, as the dial B is marked with half and quarter-yard lengths, and every yard and fraction of a yard are correctly measured without the possibility of an error. It will be observed that the reel-board C is supplied with four adjustable claws, s s s s, Fig. 4, for the purpose of holding the end of the cloth from slipping when first put upon it. When a piece of goods is measured it is taken out (with the reel-board C) of the sockets E E'; the reel-board can then be drawn out of the goods by drawing in the projecting claws s s s s by turning outward the end of the wire t, which forms an arrangement of a concealed spring, as shown in Fig. 3. It will be observed that the tension on the measure-roller D by the tension-roller I can be regulated to suit cloth of different degrees of thickness, operated by means of lever Q, as shown.

Fig. 6 is another arrangement which can be used, if necessary, to indicate the number of yards measured, which consists of a plate, 1, fastened to the side of the machine, having a groove, 1½, or rather a projecting groove, through which slides a cogged bar, 2, which is moved horizontally by the revolutions of the wheel 4, which has one pinion that strikes against the cogs of the bar and moves it the distance indicated by the pointer 5 at its outer end, pointing to the figures on the stationary plate 3 above it. When this arrangement is used the circular dial $o$ and wheel $l$ are dispensed with.

What I claim as my invention, and desire to secure by Letters Patent, is—

The perforated basket K, measure-roller D, tension-rollers H I, and reel-board C having adjustable pins $s$ $s$, when the same are combined and managed so as to operate in connection with suitable measuring-dials substantially as described.

ISAAC MILLS.

Witnesses:
W. BRUCE,
P. L. SCRIVEN.